US012800053B2

(12) United States Patent
Ilahi

(10) Patent No.: US 12,800,053 B2
(45) Date of Patent: Nov. 17, 2026

(54) VALVE ACTUATOR AND METHOD OF REDUCING CURRENT CONSUMPTION

(71) Applicant: Illinois Tool Works Inc., Glenview, IL (US)

(72) Inventor: Nader Ilahi, Langenhagen (DE)

(73) Assignee: Illinois Tool Works Inc., Glenview, IL (US)

( * ) Notice: Subject to any disclaimer, the term of this patent is extended or adjusted under 35 U.S.C. 154(b) by 40 days.

(21) Appl. No.: 18/626,744

(22) Filed: Apr. 4, 2024

(65) Prior Publication Data

US 2024/0337326 A1 Oct. 10, 2024

(30) Foreign Application Priority Data

Apr. 4, 2023 (EP) .................................... 23166614
Feb. 19, 2024 (DE) ......................... 102024104558.2

(51) Int. Cl.
*F16K 31/04* (2006.01)

(52) U.S. Cl.
CPC .................................. *F16K 31/047* (2013.01)

(58) Field of Classification Search
USPC ..................................................... 251/129.11
See application file for complete search history.

(56) References Cited

U.S. PATENT DOCUMENTS 4,392,094 A * 7/1983 Kuhnlein .................. H02P 6/10 318/400.26
4,494,051 A * 1/1985 Bailey ....................... H02P 6/06 318/400.29
4,673,160 A * 6/1987 Tolley ................... F16K 11/074 251/129.08
4,697,125 A * 9/1987 Goff ....................... G01D 5/247 318/567
4,751,438 A * 6/1988 Markunas ................. H02P 6/06 318/400.14
4,777,603 A * 10/1988 Woodman ............ G05B 19/253 318/599
4,794,309 A * 12/1988 Saito .................... G05D 3/1445 318/9
5,040,568 A * 8/1991 Hair .................... F15B 13/0444 310/36
5,083,744 A * 1/1992 Oliver ................... F16K 31/041 137/554
5,148,070 A * 9/1992 Frye .................... H02P 25/0925 310/68 B
5,173,651 A * 12/1992 Buckley .................... H02P 6/06 310/179

(Continued)

*Primary Examiner* — Matthew W Jellett

(74) *Attorney, Agent, or Firm* — McAndrews, Held & Malloy, Ltd.

(57) ABSTRACT

Valve actuators and methods of reducing current consumption of a valve actuator are disclosed. An example valve actuator includes a motor configured to move the actuator to an activated position. A return means biases the actuator to a default deactivated position. A controller, in communication with the motor, is configured to receive instructions regarding the actuation state of the actuator and to operate the motor according to those instructions. The controller operates the motor using a pulse width modulated current to allow the motor to overcome the return means and thereby maintain the actuator in the actuated position.

17 Claims, 2 Drawing Sheets

(56) References Cited

U.S. PATENT DOCUMENTS

| | | | | | |
|---|---|---|---|---|---|
| 5,694,010 | A * | 12/1997 | Oomura | H02H 7/0833 318/400.07 |
| 6,460,567 | B1 * | 10/2002 | Hansen, III | F16K 31/04 137/625.48 |
| 8,708,089 | B2 * | 4/2014 | Kitahata | B62D 5/0409 180/443 |
| 9,366,353 | B2 * | 6/2016 | Ooe | F16K 31/04 |
| 9,528,624 | B2 * | 12/2016 | Naganuma | F16K 31/046 |
| 10,079,087 | B2 * | 9/2018 | Matsumoto | F02D 41/1408 |
| 10,935,155 | B2 * | 3/2021 | Zhang | F25B 41/35 |
| 11,496,036 | B2 * | 11/2022 | Kawada | H02K 7/116 |

* cited by examiner

VALVE ACTUATOR AND METHOD OF REDUCING CURRENT CONSUMPTION

RELATED APPLICATIONS

This application claims priority to European (EP) Patent Application No. 23166614.0, filed Apr. 4, 2023, and to German (DE) Patent Application No. 102024104558.2, filed Feb. 19, 2024. The entireties of European (EP) Patent Application No. 23166614.0 and German (DE) Patent Application No. 102024104558.2 are incorporated herein by reference.

TECHNICAL FIELD

The present disclosure relates to a valve actuator and a method of reducing current consumption of the same.

BACKGROUND

Fail safe systems are increasingly incorporated into products and systems. One example fail safe system is with valves in machinery. If a system experiences a problem and power is lost, the system needs to fail in a safe manner. With respect to valves, this means that any valves should automatically close off preventing the undesirable continued flow of fluids which may present a hazard in a shut off system.

In order to achieve this automatic valve actuators may be provided with a return means, that, in the absence of power or when in an off state, places the actuator in a deactivated state, that is one where the valve would be closed.

This means that for a valve to be open, the actuator must be in an actuated state. Following the above fail safe requirements, the system must be on and drawing power to maintain the actuator in the activated state, as to not do so would engage the fail safe with the return means returning the valve to the closed position by deactivating the actuator.

While providing the advantageous properties of a fail safe, the down side is the continuous power draw by the activator to maintain the valve in the open state, against the return means. This means the activator is inherently inefficient as it requires a current draw constantly when in the activated position.

Therefore, it is an object of the present disclosure to provide a valve actuator, and method of controlling a valve actuator, that minimises the current draw even when in the activated position.

SUMMARY

According to a first aspect of the disclosure, there is a provided valve actuator comprising a motor configured to move the actuator to an activated position; a return means, the return means biasing the actuator to a default deactivated position; a controller in communication with the motor, the controller configured to receive instructions regarding the actuation state of the actuator and to operate the motor according to those instructions; wherein the controller is further configured to operate the motor using a pulse width modulated current to allow the motor to overcome the return means and thereby maintain the actuator in the actuated position. The use of pulse width modulation means that the motor is controlled using a pulsed current rather than a constant current flow. The off periods therefore provide efficiency savings in reducing the amount of current consumed, thereby prolonging, for example, battery life in electric vehicles. Ideally the amount of pulse width modulated current supplied is the minimum required in order to prevent the force applied by the return means from dominating the system, which would lead to deactivation of the actuator.

Advantageously, the pulse width modulation comprises on periods and off periods, wherein a duration of the off periods is determined based on a time required by the return means to overcome a static friction of the valve actuator. In this way the minimum pulse length required to supply sufficient current to the motor to maintain the activated position of the actuator may be determined.

Preferably, the duration of at least one of the off periods is less than about 1 ms. Although it will be apparent that other durations may be required depending on a given system. Where, for example, the return means is a spring, the time required for the spring to overcome static friction in the system of a valve actuator is typically more than 1 ms. Therefore, by ensuring the duration of the off periods is less than the time required for the spring to overcome static friction, less current is required. The static friction and any other inherent impeding force in the system may be used to increase the duration of the off periods as no additional power is required by the motor to maintain the position of the actuator. The actuator is momentarily held in its activated position by the static friction inherent in the system.

Suitably a valve may be provided with the above described valve actuator, such that the actuator may be integrally formed with the valve during manufacture or pre-attached to the valve post manufacture of the valve. Alternatively, the actuator may be supplied separately to the valve and designed to be retro-fitted to suitable valves.

According to a second aspect of the disclosure, there is provided method of reducing current consumption of a valve actuator, the valve actuator comprising a motor configured to move the actuator to an activated position; a return means, the return means biasing the actuator to a default deactivated position; a controller in communication with the motor, the controller configured to receive instructions regarding the actuation state of the actuator and to operate the motor according to those instructions; wherein the method comprises applying, via the controller, a current to the motor to cause the motor to move the actuator from a deactivated position to an activated position; once the actuator is in the actuated position, applying, via the controller, a pulsed current to allow the motor to overcome the return means and thereby maintain the actuator in the actuated position. In this way current consumption may be reduced as only the current required to maintain the actuator in an activated position is used. The method can take advantage of static friction inherent in the system to prolong the off periods, thereby making additional savings of current consumption.

BRIEF DESCRIPTION OF SEVERAL VIEWS OF THE DRAWINGS

Example embodiment(s) of the disclosure are now described, by way of example only, hereinafter with reference to the accompanying drawings, in which.

DETAILED DESCRIPTION

Figure 1:
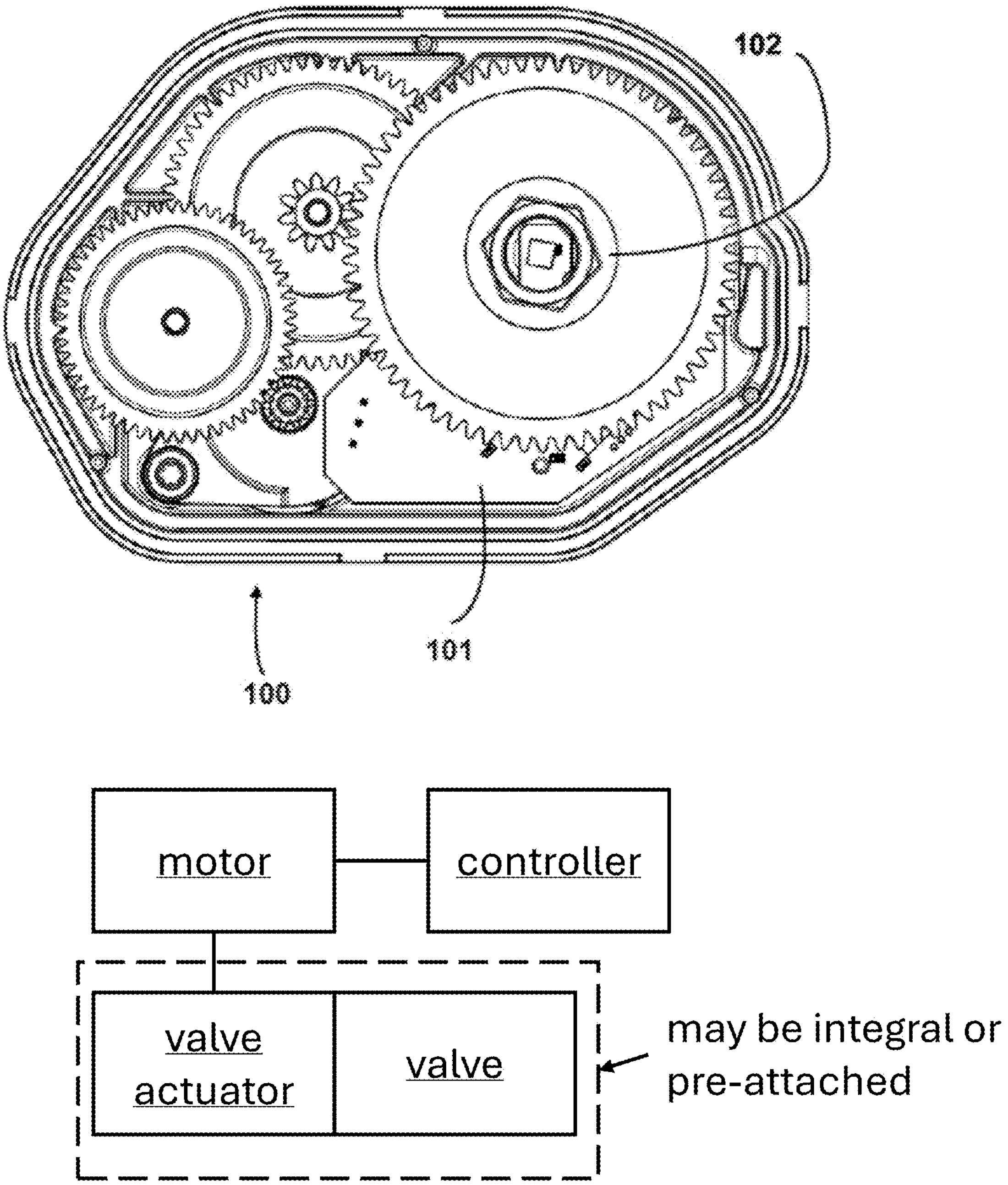
FIG. 1 shows an internal view of a valve actuator.

The described example embodiment relates to a valve actuator and a method of reducing current consumption of the same. However, the disclosure is not necessarily restricted to valve actuators but may also be used with any other system that would benefit from the method of reducing current consumption as disclosed herein.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner. Like reference numerals are used to depict like features throughout.

Referring now to FIG. 1, there is provided a valve actuator 100 (shown as a partial internal cross section through a gear box of the actuator). The valve actuator 100 comprises a controller 101, motor (not shown), and return means 102. The motor is preferably connected to the valve actuator 101 and return means 102 via a transmission system, possibly comprising or including a gear box.

The valve actuator may suitably be used to activate any valve where, for safety or other reasons, the valve is to be placed in a closed position by default, e.g. when the system comprising the valve is in an off state or an error state, the valve will automatically close. The present actuator and method may be used to minimise power consumption by the valve actuator in having to actively maintain the valve in an open position during operation of the system comprising the valve. Example systems include, by way of non-limiting example, process control valves, safety relief valves, ballast system valves, heating, ventilation, and air conditioning systems (HVAC systems), fire protection system valves, and automotive vehicles, particularly electric vehicles and cooling systems for vehicles (such as battery and other cooling systems for electric vehicles).

The motor is any suitable for moving the valve actuator 100 from a deactivated position to an activated position, such as but not limited to, a DC motor; servo motor; stepper motor; AC motor with variable frequency drives (VFDs); or a brushless DC electric motor (BLDC motor). It should be noted here that deactivated position means a position in which the valve actuator places a valve connected thereto into a closed position. Activated position means a position in which the valve actuator places a valve connected thereto into a non-closed position, such as fully open or an intermediate state between closed and open such that a fluid flow is permitted but restricted below the full flow capacity of the valve in the open state. The motor must also be suitable to be controlled by pulse width modulation of a current.

The return means 102 is any suitable for moving the valve actuator 100 from an activated position to a deactivated position. Preferably the return means 102 is passive and automatic. That is, no outside control or instruction is required in order for the return means to perform the function of placing the valve actuator into a deactivated position. The return means 102 may be overcome by the motor, when the motor places the valve actuator into the open position. When the motor is not acting on the system the return means returns the valve actuator to a deactivated position, thereby ensuring any connected valve is always placed in the closed position when not in use.

The controller 101 supplies current to the motor to move the valve actuator 100 to an activated position according to the needs of the system, such as, by way of non-limitative example, opening a valve to permit the flow of coolant in a battery cooling system for an electric vehicle. The controller may operate the motor such that the valve is fully open, or turn off the motor thereby allowing the return means to operate and close the valve. The controller may be able to finely control the motor thereby permitting control of the volume of fluid allowed to pass through the valve in a given time. The controller may achieve this using pulse width modulation of current to the motor.

Figure 2:
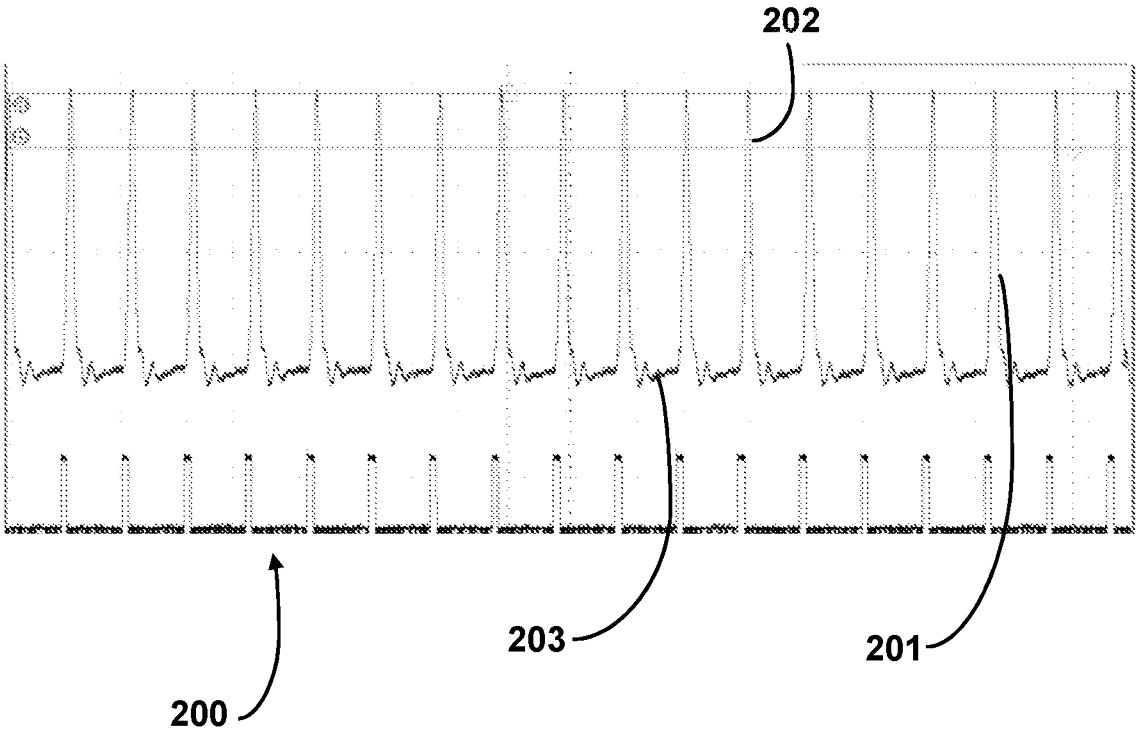
FIG. 2 illustrates current consumption of a valve actuator.

With reference to FIG. 2, the pulse width modulation of current to the motor may be varied to achieve a reduction in the amount of current consumed for a given position of the valve actuator when in an activated state. The graph 200 displays current supplied against time 201. As can be seen, the current is displayed in pulses 202, representing "on" periods. Periods where minimum or no current is provided 203 are "off" periods during which no current is consumed by the motor for the purposes of maintaining the actuator in an activated position. The motor may however consume current for other purposes, which is therefore a minimum operational current.

The duration of the off periods may be tailored, and preferably maximised, in order to reduce the amount of current consumed by the motor. Due to inertia in the system and the time required for the return means to be able to begin moving the actuator into the deactivated position, the motor does not need to be provided with a constant current. The actuator will momentarily remain static, and in the state into which it was placed by the motor, without a current being supplied to the motor to maintain that state. The present disclosure takes advantage of that delay by only supplying current to ensure the actuator is maintained in the required state and using the delay in the return mechanism acting to stop supplying current for that period.

The inertia in the system is predominantly due to static friction which naturally resists motion and helps hold the valve in place. Static friction makes it possible to temporarily rest the motor without compromising the valve's position. Static friction is important at the beginning of movement because it requires a certain amount of force to overcome the initial resistance of the components of the actuator, for example a stationary geartrain, if present. This initial resistance is caused by the interaction of, for example, gear teeth and their contact with each other. Once the actuator is set in motion, the friction decreases considerably, and the motor/return means can then provide less torque to maintain the speed of operation of the valve actuator. However, at the start, it is important to have sufficient torque to overcome the static friction.

The duration of the off periods for a given system may be determined as follows:

$$I\alpha = \sum_{0}^{n} C_n$$

Where I is the moment of inertia, a is acceleration, and Cn are the torques present in the system. It will be apparent that the torques comprises various components, including but not limited to the torque of the return means (such as a spring), torque provided by the load, and torque provided by static friction. The moment of inertia (I) may be calculated using:

$$I = mr^2$$

Where m is mass and r is the distance from the center of the mass to the axis of rotation.

Angular acceleration (a) may then be derived by:

$$T = Ia$$

Where T is the torque. The time may then be calculated using:

$$\theta = 0.5at^2$$

Where e is the angular displacement, a is the angular acceleration and t is time. In an example system, rotation of 0.5° by the return means, for example, is required to overcome the static friction. This equates to, using the above formulae, approximately 1 ms (where the required torque is, by way of example, 0.2 Nm. The torque required will be system dependent). As the required torque is used in the above equations the pulse width modulation can be varied to inject the minimum required current to provide the necessary torque to the motor periodically, the period matching, or being less than, the time required to overcome the static friction.

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible.

The invention claimed is:

1. A valve actuator, comprising:

a motor configured to move the actuator to an activated position, where a deactivated position is a default position; and a controller in communication with the motor and configured to:

receive instructions regarding the actuation state of the actuator and to operate the motor according to those instructions; and operate the motor using a pulse width modulated current to allow the motor to maintain the actuator in the activated position during both ON and OFF periods of the pulse width modulated current, wherein a duration of each OFF period is equal to or less than a time required to overcome a static friction of the valve actuator.

2. The valve actuator as defined in claim 1, further comprising a transmission system connecting the motor to a return member, wherein the return member is configured to bias the actuator toward the deactivated position.

3. The valve actuator as defined in claim 2, wherein the transmission system includes a geartrain.

4. The valve actuator as defined in claim 1, wherein the motor is any of: a DC motor; a servo motor; a stepper motor; an AC motor with variable frequency drives; or a brushless DC electric motor.

5. A valve comprising the valve actuator as defined in claim 1.

6. The valve as defined in claim 5, wherein the valve actuator is either integrally formed with the valve or pre-attached to the valve.

7. The valve actuator as defined in claim 1, wherein a duration of at least one of the OFF periods of the pulse width modulated current is less than 1 ms.

8. A valve system comprising:

a valve body including a movable valve element;

a valve actuator mounted to the valve body and operable to move the valve element between open and closed states;

a motor in the actuator arranged to drive motion of the valve element;

a return member configured to bias the valve actuator toward a default state; and a controller configured to:

receive a valve state command reflecting a commanded position;

apply a PWM control signal to the motor in response to the valve state command, wherein the PWM control signal comprises ON periods and OFF periods; and during the OFF periods, supply a minimum required holding current through the motor, the minimum required holding current being calculated based on a static friction of the valve actuator, in order to maintain the actuator in the commanded position through both the ON periods and the OFF periods, wherein a duration of each OFF period is equal to or less than a time required to overcome the static friction of the valve actuator.

9. The valve system of claim 8, wherein the controller is configured to adaptively adjust a duty cycle of the PWM control signal based on one or more of a sensed load, motor temperature, or actuator feedback to minimize power consumption while ensuring retention of the commanded position.

10. The valve system of claim 8, wherein the controller is further configured to ramp the motor current at transitions between ON and OFF periods to reduce mechanical shock or overshoot of the actuator.

11. The valve system of claim 8, wherein, in response to a deactivation instruction, the controller ceases the PWM control signal to drive the actuator back toward the default state.

12. The valve system of claim 8, wherein the holding current is less than half of a full operating current of the motor.

13. The valve system of claim 8, wherein a duration of the OFF periods is determined based on a time required by the return member to overcome a static friction of the valve actuator, wherein a minimum operational current flows during the OFF periods.

14. The valve system of claim 13, wherein the controller calculates the duration of the OFF periods of the pulse width modulated current as a function of a moment of inertia, angular acceleration, and torques present in the system, including static friction of the valve actuator.

15. A method of reducing current consumption of a valve actuator, the method comprising:

applying, via a controller in communication with a motor configured to move a valve actuator to an activated position, a current to the motor to cause the motor to move the actuator from a deactivated position to an activated position; and in response to the actuator achieving the activated position, applying, via the controller, a minimum required pulsed current to the motor to allow the motor to overcome a return member configured to bias the actuator to a default deactivated position, to thereby maintain the actuator in the activated position during both ON and OFF periods of the pulse width modulated current, wherein a duration of each OFF period is equal to or less than a time required to overcome a static friction of the valve actuator, and wherein the minimum required pulsed current is calculated based on a moment of inertia, angular acceleration, and torques present in the system including static friction of the valve actuator.

16. The method of claim 15, wherein the controller determines the duration of the OFF periods of the pulse width modulated current by calculating a moment of inertia of the system, an angular acceleration of the motor, and torques present in the system.

17. The method of claim 16, wherein the controller uses the equation, $$I\alpha = \sum_{0}^{n} C_n$$

to calculate the duration of the off period, wherein I is the moment of inertia, a is acceleration and Cn are the torques present in the system.

* * * * *